United States Patent [19]
DiLoreto

[11] Patent Number: 5,390,154
[45] Date of Patent: Feb. 14, 1995

[54] COHERENT INTEGRATOR

[75] Inventor: Aldo G. DiLoreto, Alhambra, Calif.

[73] Assignee: The United States of America as represented by the Secretary of the Navy, Washington, D.C.

[21] Appl. No.: 510,976

[22] Filed: Jul. 14, 1983

[51] Int. Cl.$^6$ ............................................. G01S 15/00
[52] U.S. Cl. ..................................................... 367/98
[58] Field of Search ........................ 364/514, 516, 517; 367/92, 97, 98, 100, 102, 122, 123, 124, 126, 900, 901, 904, 905, 910; 343/5 DP, 5 R, 17.1 R, 378; 340/347 M, 347 NT, 347 CC, 347 SH, 347 DF

[56] References Cited
U.S. PATENT DOCUMENTS

| | | | |
|---|---|---|---|
| 2,410,233 | 10/1946 | Percival . | |
| 3,023,966 | 3/1962 | Cox et al. | 343/378 |
| 3,145,341 | 8/1964 | Andrew | 367/125 |
| 3,337,870 | 8/1967 | Allen et al. | 347/100 |
| 3,412,372 | 11/1968 | Ladstatter | 367/122 |
| 3,505,637 | 4/1970 | Abruzzo | 367/98 |
| 3,696,414 | 10/1972 | Allen et al. | 367/100 X |
| 3,723,952 | 3/1973 | Walsh | 367/100 |
| 3,787,803 | 1/1974 | Beebe | 367/98 X |
| 3,798,590 | 3/1974 | Jacobson et al. | 367/102 X |
| 3,882,444 | 5/1975 | Robertson | 367/100 X |
| 4,167,753 | 9/1979 | Lynk | 367/98 X |
| 4,274,148 | 6/1981 | van't Hullenaar | 367/900 X |
| 4,297,745 | 10/1981 | Layton | 367/98 X |
| 4,420,824 | 12/1983 | Weber | 367/900 X |

*Primary Examiner*—Daniel T. Pihulic
*Attorney, Agent, or Firm*—Harvey Fendelman; Thomas Glenn Keough; E. W. Rusche, Jr.

[57] ABSTRACT

A method and circuit for performing coherent integration on a signal output from a conventional signal processing circuit's detector/averager is presented. The post-processing coherent integrator is designed to be inserted in a conventional signal processing circuit between the detector/averager circuit and the threshold detector circuit.

A digital form of the post processing coherent integrator comprises a sample-and-hold circuit to receive a signal output from the detector averager of the conventional signal processing circuit, an analog-to-digital converter, a delay and multiplier circuit, a memory circuit for storing weighting constants, a summer circuit, and an output to a conventional signal processing system's threshold detector and display. The delay and multiplier circuit operates on N samples of the input signal and causes each sample to be delayed sequentially over a delay ranging from a lower limit of 0 delay up to an upper limit of $(N-1)T$ delay where T is a preselected interval of time and each delay is some different integral multiple of T. Following the delay of each sample, each sample is then multiplied by a predetermined weighting constant. The set of delayed and weighted sample signals are then summed to form a coherent output signal containing information from each delayed and weighted signal sample. This output signal is then fed to the conventional signal processing system's threshold detector and display. An alternative to this integrator incorporates means for real time adaptive setting of the weighting constants.

An analog form of the post-processing coherent integrator comprises N-delay lines which function as the delay portion of the above delay and multiplier circuit. In addition, following each delay line is a variable resistor which is preset at a predetermined value to attenuate the signal from the delay lines thereby performing effectively the weighting process on these signals. Following this, all the signals are summed and amplified to again provide an output signal containing information from each delayed and weighted signal sample.

7 Claims, 2 Drawing Sheets

COHERENT INTEGRATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Active sonars are used to detect the presence of submarines and other underwater objects. The detection process usually consists of an operator noting a change in the background produced by acoustic energy reflected from the object under surveillance. The receiver subsystem consists of arrays of hydrophones and preamplifiers, a spatial processor (or beam former), a set of time varying gain and automatic gain control receive channels, temporal processors/post processors and display.

Coherence, as it pertains to signal processors, means that phase as well as amplitude information is used to extract signals from a masking background. A coherent processor can be implemented in a number of ways but the most common, in present sonars, is to store a digitized replica of the transmitted pulse, to then multiply the echo bearing return by the stored replica and, finally, to integrate the product over a period equal to the transmitted pulse length. The process is then periodically repeated with a time shifted return. Such a system is known as a replica correlator (or matched filter) signal processing system. During active sonar operations any factor that prevents the signal observed at the input to the processor from being a facsimile of the stored replica will reduce the coherence and, in turn, lower the processing gain.

Those factors that can prevent full processing gain from being realized can be partitioned into three groups. The first is comprised of system related elements and takes into account the coherence loss introduced by the methodologies used to replicate the transmission, compensate for own ship motion, and preprocess the return. The second is comprised of all environment related factors, and the last considers coherence loss introduced by target size and motion. Changes in the transmitted sonar signal caused by these factors are noted as dispersive changes to the signal.

Of particular interest for this invention is the dispersion caused by the environmental factors, or the effects of the medium upon the propogation of the signal, and target dispersion which is created by the fact that a submarine or other underwater object will contain many reflecting surfaces which cause the energy of the reflected signal to be spread over a time period greater than that of the original pulse (or sonar signal).

Dispersion caused by the environment or the medium is a multi-path phenomenon and as such is dependent, to a large degree, on the number of acoustic paths that contribute to form the acoustic return. This number is, in turn, dependent on the water depth and the co-latitudinal main response axis used for transmission. The largest signal distortions (corresponding to the greatest dispersion) are obtained during shallow water operations and in deep water when bottom reflected paths are used. The effect of environmental dispersion can be modeled as a discrete number of single, separate paths between the source of the signal, the target or reflector, and the receiver.

Since the medium and target are both dispersive, the replica correlator no longer serves as a true matched filter. With dispersion, one knows intuitively that the signal that appears at the envelope detector output has a time-bandwidth product greater than 1. This suggests the possibility of interposing a post-processor between the envelope detector and the thresholder as a mechanism to regain some of the dispersive loss.

SUMMARY OF THE INVENTION

The present invention presents a post-processing circuit and method designed to regain dispersive losses caused by the medium and target. The conventional cross-correlator in a coherent receiver is followed by a linear (or square law) detector, averager, threshold circuit, and display. The averaging time of such a conventional system is matched to the time resolution of the transmission, i.e., 1/bandwidth. The present invention presents a post-processing circuit inserted after the averager and before the thresholding circuit.

The post-processing circuit is designed to take samples of the detected waveform, delay them by an appropriate time delay, multiply them by an appropriate weighting constant, and then to sum the separated signals for feeding into the threshold circuit. Such a circuit can be represented by a sample and hold circuit connected to the output of the averager, an analog-to-digital converter connected with its input to the output of the sample/hold circuit, a delay and multiplier circuit connected to the output of the analog-to-digital converter, a memory unit containing the stored weighting constants inputting the multiplier, and a summing circuit connected to the output of the multiplier circuit. The output of the summing circuit then feeds the composite signal to the threshold detection circuit and on to display.

OBJECTS OF THE INVENTION

An object of this invention is to present a post-processor in a signal processing circuit to increase processing gain of signals which have been distorted by environmental and target caused distortion.

A second object of the invention is to present a post-processing circuit and method which receives a preprocessed signal from an envelope detector and averager, selectively delays and attenuates samples of this signal, and then sums these delayed and attenuated samples, and outputs them to a threshold circuit and display.

Other objects, advantages and novel features of the invention will become apparent from the following detailed description of the invention when considered in conjunction with the accompanying drawings.

DESCRIPTION OF THE PREFERRED EMBODIMENT

Figure 1:
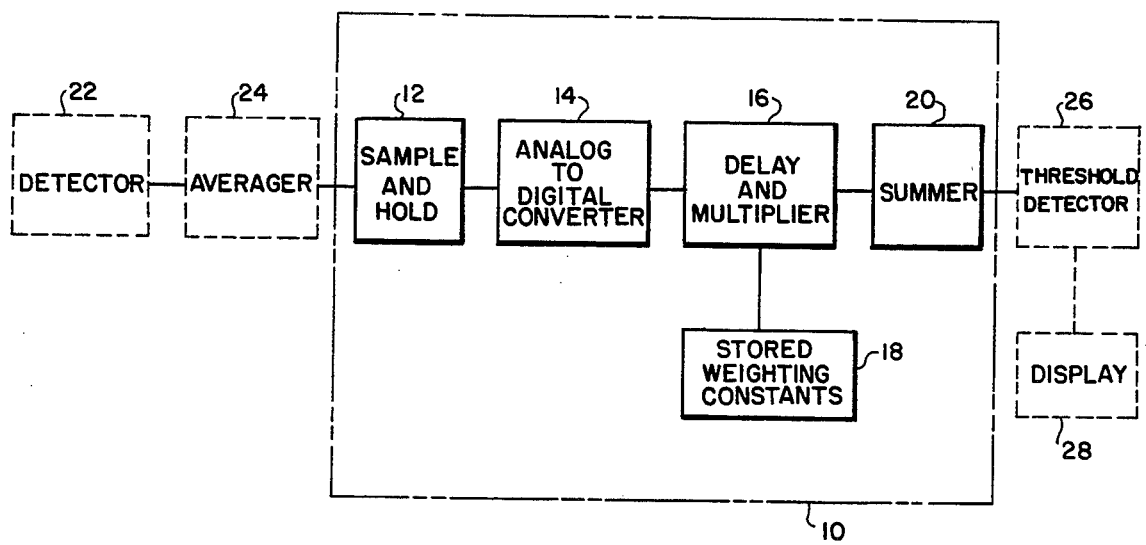
FIG. 1 is a block diagram of the coherent integrator.

A block diagram showing a generalized version of the post-processor is presented in FIG. 1. The coherent integrator circuit is shown as item 10. Present art portions of the signal processing circuit are the detector 22, averager 24, threshold detector 26, and a display 28. The coherent integrator circuit consists of a sample and hold circuit 12, an analog-to-digital converter 14, a delay and multiplier 16, a memory facility for storing weighting constants 18, and a summer 20.

The detected and averaged waveform from a conventional signal processing circuit is fed into the sample-and-hold circuit 12 and then to analog-to-digital converter 14. Samples of the detected waveform are collected, delayed by preset appropriate time delays and multiplied by preselected weighting constants within the delay and multiplier 16. The preselected weighting constants are stored in a memory unit 18 which is connected to delay and multiplier 16.

Following the delay and multiply function the signal is sent to a summer where the independent samples of the detected waveform that have been delayed and multiplied are summed together. The output of the summer then feeds a threshold detector 26 for determination of the existence of a target. Following threshold detection the signal is fed to display 28.

The amount of delay between sample signals is to be determined from the characteristics expected for the transmission path of the reflected signal. For example, if environmental dispersion is restricted to a 3-path multiple arrival, the envelope of the transmitted pulse will likely arrive at the receiver as three pulses separated from each other by some approximate delay time T. If this signal is post-processed wherein the waveform output from the conventional processing system is sampled into three segments with each segment delayed from the arrival of the prior segment by the period T, and then summed, it can be recognized that the output signal of the composite waveform will contain information of all three reflected pulses.

Selective weighting applied to each pulse period can amplify the effect of a returning pulse from a target while discriminating against the general noise field. This has the effect of improving the signal gain to be obtained from the post-processing circuit. Clearly, more complex signals can also be post-processed yielding an improved gain given some a priori knowledge concerning the environmental conditions and target structure necessary for determining the magnitude of the delays and the magnitudes of the weighting coefficients to be applied. The processing gain that can be expected is represented by the equation, $$PG = 1 + \sum_{i=1}^{N} a_i^2$$

where $a_i$ are the weighting coefficients and N represents the number of delays used.

Figure 2:
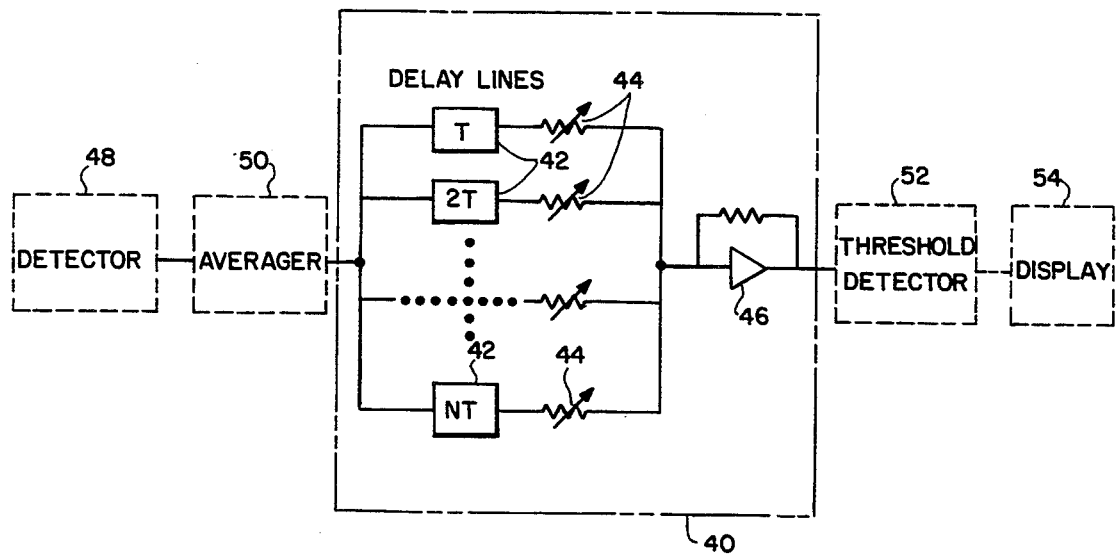
FIG. 2 is a block diagram showing an analog implementation of a coherent integrator.

FIG. 2 shows a block diagram of an analog implementation of the coherent integrator. The detector 48 and averager 50 from a conventional processing system feed the signal into the analog coherent integrator 40. The output from the analog coherent integrator is then fed to a conventional threshold detector 52 and on to display 54.

The analog coherent integrator comprises an input from averager 50 which feeds a plurality of parallel delay lines 42. The delay lines are selected in a manner that successive delays are applied to the input signal from a period T up to a total delay period of N×T. The period T represents the increment delay between each delay line and the index N represents the total number of delay lines selected to be used. Following each delay line variable resistors 44 are inserted. These resistors provide the means to attenuate the signal's output from the delay lines by some predetermined amount. This in essence creates the weighting of the waveform output from each delay line. Combination of all delayed signal samples is then combined and fed through the summing amplifier 46. Output from the summing amplifier is then fed to threshold detector 52 and on to display 54.

Figure 3:
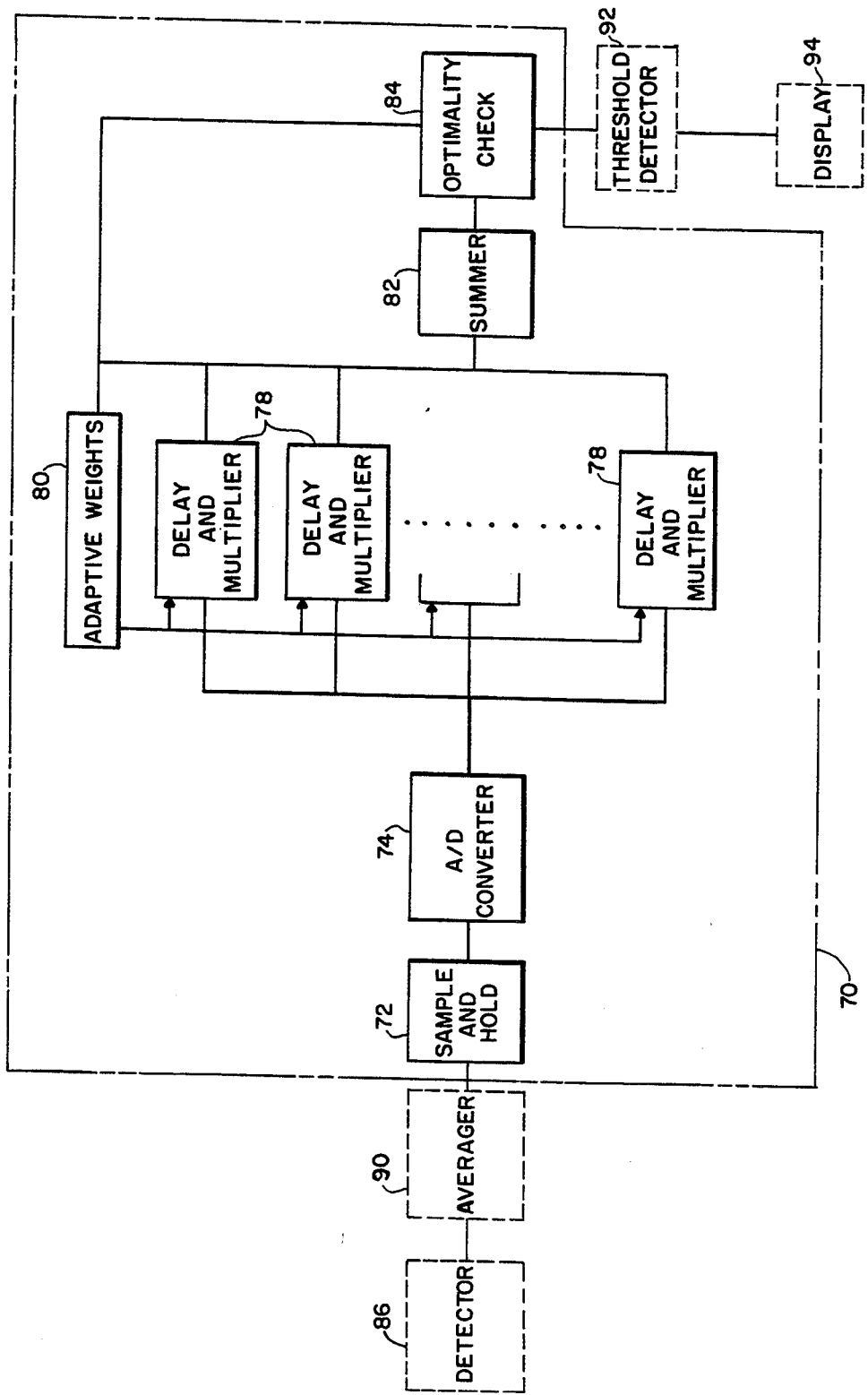
FIG. 3 is a block diagram showing an adaptive coherent integrator.

The concept of a coherent integrator as a post-processor can be extended to make use of adaptive concepts as shown in FIG. 3. In FIG. 3, the conventional signal processing circuit processes the received signal through detector 86 and averager 90, and outputs it to the post-processing circuit 70. Following post-processing, the output signal is again passed through threshold detector 92 and on to display 94.

The post-processing circuit for an adaptive coherent integrator comprises a sample-and-hold circuit 72 which receives the output of the detector and averager of the conventional processing system, an analog-to-digital converter 74, a plurality of delay and multiplier circuits 78, an adjustable adaptive weight circuit 80, a summer 82, and an optimality checking circuit 84.

The digitized waveform is directed into the plurality of delay and multiplier circuits where each cause incremented delays to the signal much as was accomplished in the analog coherent integrator circuit shown in FIG. 2. Adaptive weighting coefficients are supplied through circuit 80 to each of the delay and multiplier circuits 78. These adaptive weights are multiplied into the waveforms. The delayed and weighted waveform samples are combined into summer 82 and are output into the optimality check circuit 84. The optimality checking circuit 84 determines the magnitudes to be used for the next set of adaptive weights to be applied to later incoming waveforms from the conventional signal processing circuit.

The optimality checking circuit 84 can be predesigned to check a quality criteria factor such as the measured voltage level of the signal output from summer 82. Based on this criteria, circuit 84 in conjunction with circuit 80 will selectively apply an updated set of weighting coefficients on the next set of sampled signals.

It is conceivable, as an alternative, that the adaptive weights could be determined by a computer which is attached to receive the output signal of the summer and through a preprogrammed algorithm determine and update the magnitudes of the adaptive weights to be applied on later incoming waveforms. The optimal weighting factors determined at this point will provide a measure of the dispersive properties of the medium and target.

The final information is output from the post-processor to a threshold detector and to display. This technique will recover a large amount of all dispersive losses and will make partial success possible, especially during periods of lost target, or in a detection scenario when the signal-to-noise ratio is not quite high enough to call a detection.

Obviously many modifications and variations of the present invention are possible in the light of the above teachings. It is therefore to be understood that within the scope of the appended claims the invention may be practiced otherwise than as specifically described.

What is claimed is:

1. A post-processing coherent integrator for use in a signal processing circuit, said coherent integrator being inserted between a detector circuit and a threshold detector circuit of said signal processing circuit, which comprises:
  a sample-and-hold circuit whose input is connected to receive as an analog input signals, an output of the detector circuit of the signal processing circuit, said sample-and-hold circuit sampling its analog input signal and maintaining it for a predetermined period of time at a sampling magnitude;
  an electronic analog to digital circuit whose input is connected to receive an analog output from the sample-and-hold output, circuit for converting an input analog signal to an output digital signal;
  plurality (N) of means, whose inputs are connected to receive an output digital signal of the analog to digital circuit, for delaying sequentially each of N samples of the input signal over a delay range from 0 delay up to (N−1) T delay where T is a preselected interval of time and each delay is some different integral multiple of T;
  plurality (N) of electronic multiplying circuits, each with its input connected to an output of one of the plurality of delaying means, for multiplying each respective delayed signal by one weighting circuit from a predetermined set of weighting circuits;
  a programmable electronic memory circuit, whose output is connected to each of the electronic multiplying circuits for storing a predetermined set of weighting constants used by all of the electronic multiplying circuits; and
  an electronic summing circuit, whose input is connected to receive an output of each electronic multiplying circuit, for summing signals that are delayed and weighted from the plurality of the electronic multiplying circuits, said electronic summing circuit thereby providing a coherent output signal having portions thereof attributed to each delayed and weighted signal sample, said electronic summing circuit's output then connected to an input of the threshold detector circuit of the signal processing circuit.

2. An analog post-process coherent integrator for use in a signal processing circuit, said coherent integrator being inserted between a detector circuit and a threshold detector circuit of said signal processing circuit, which comprises:
  plurality (N) of electronic delay lines, each preset to cause a different delay where each delay is some different integral multiple of the preselected interval of time T, and the different delays range from 0 delay to a maximum of N−1) T delay, whose inputs are connected to receive an output of the detector circuit of said signal processing circuit, for delaying sequentially each of the N samples of the input signal over a delay range from 0 delay up to (N−1) T delay where T is a preselected interval of time and each delay is some different integral multiple of T;
  plurality of (N) of variable resistors whereby the resistance value can be preset to a predetermined attenuating value for each said resistor, each having an input connected to an output of one of the plurality of electronic delay lines for multiplying each respective delayed signal by one weighted component;
  an electronic summing amplifier whose input is connected to receive an output of each variable resistor, for summing the delayed and weighted signals from the plurality of the variable resistors, the electronic summing amplifier thereby providing a coherent output signal having portions thereof attributed to each delayed and weighted signal sample, said electronic summing amplifier's output then connected to an input of the threshold detector circuit of the signal processing circuit.

3. An adaptive post-processor coherent integrator for use in a signal processing circuit, said adaptive coherent integrator being inserted between a detector circuit and a threshold detector circuit of said signal processing circuit, which comprises:
  a sample-and-hold circuit whose input is connected to receive as an analog input signal, an output of the detector circuit of the signal processing circuit, said sample-and-hold circuit sampling its input signal and maintaining it for a predetermined period of time at a predetermine sampling magnitude;
  an electronic analog to digital converter circuit, whose input is connected to the sample-and-hold circuit's output, for converting an input analog signal to an output digital signal;
  plurality (N) of means, whose inputs are connected to the output of the electronic analog to digital converter, circuit for delaying sequentially each of the N samples of the input signal over a delay range from 0 delay up to (N−1) T delay where T is a preselected interval of time and each delay is some different integral multiple of T;
  a plurality (N) of electronic multiplying circuits, each with an input connected to an output of one of the plurality of delaying means, for multiplying each respective delayed signal by one weighting constant from an adaptively preset set of weighting circuits;
  means, whose output is connected to each of the electronic multiplying circuits, for storing the preset set of adaptive weighting circuits to be used by the electronic multiplying circuits;
  an electronic summing circuit, whose input is connected to the output of each electronic multiplying circuits, for summing the delayed and weighted signals from the plurality of the electronic multiplying circuits, said electronic summing circuit thereby providing a coherent output signal having portions thereof attributed to each delayed and weighted signal sample; and
  means, whose input is connected to the output of the electronic summing circuit, for checking the coherent output signal level, said checking means having a first output connected to feed a control signal back to the storing means to implement an update modification in the magnitudes of the weighting coefficients stored therein, said checking means also having a second output connected to an input of the threshold detector circuit of the conventional signal processing circuit.

4. An adaptive post-processor coherent integrator according to claim 3 wherein the adaptive weighting coefficient storing means comprises:
  a programmable electronic memory circuit.

5. A coherent integrating method for post-processing a signal output from a detector circuit of signal processing circuit, said method comprising the steps of:

sampling and holding an input signal for a predetermined period of time at a predetermined sampling magnitude;

converting the input sample-and-hold signal from an input analog signal to an output digital signal;

creating N separate samples of the digital signal wherein each sample is delayed a different period ranging from a lower limit of 0 delay up to an upper limit of $(N-1)$ T delay where T is a preselected interval of time and each delay is some different integral of T;

multiplying each respective delayed signal by an adaptively predetermined weighting constant;

summing the weighting constant multiplied signal samples together to form a coherent output signal having portions thereof attributed to each delayed and weighted signal sample; and outputting the summed signal to a threshold detector and display unit of a signal processing circuit.

6. An analog coherent integration method for post-processing in a post-processor a signal from a detector circuit of a signal processing circuit, said method comprising the steps of:

dividing the signal at the post-processor into N samples;

delaying each of the N sample sequentially with different delays ranging from a lower limit of 0 delay up to an upper limit of $(N-1)$ T delay where T is a preselected interval of time and each delay is some different integral multiple of T;

attenuating each delayed sample by a weighting resistor;

summing the signals after being weighted by the resistors, said summing thereby providing a coherent output signal having portions thereof attributed to each delayed and weighted signal sample; and outputting the summed signal sample to a threshold detector and display circuit of the signal processing system.

7. An adaptive coherent integration method for post-processing in a post-processor a signal from a detector circuit of a signal processing circuit, said method comprising the steps of:

sampling and holding the signal for a predetermined period of time at a predetermined sampling magnitude;

converting the sample-and-hold signal from an input analog signal to an output digital signal;

creating N separate samples of the digital signal wherein each sample is delayed a different period ranging from a lower limit of 0 delay up to an upper limit of $(N-1)$ T delay where T is a preselected interval of time and each delay is some different integral of T;

multiplying each respective delayed signal by an adaptively predetermined weighting constant;

summing the delay and weighted signal samples together to form a coherent output signal having portions thereof attributed to each delayed and weighted signal sample;

performing an optimality check on the signal output after summing to determine the next set of adaptive weighting coefficients to be applied in the multiplying step on the delayed signal samples;

updating the adaptive weighting coefficients to be applied to the next set of N sample signals; and output the post-processed signal following the optimality check to the signal processing system's threshold detector and display unit.

* * * * *